(12) United States Patent
Kerin et al.

(10) Patent No.: US 8,282,139 B2
(45) Date of Patent: Oct. 9, 2012

(54) QUICK CONNECTOR WITH SEAL ASSEMBLY RETAINER

(75) Inventors: Jim Kerin, Gross Pointe Woods, MI (US); Stephen Gunderson, Marine City, MI (US); Richard M. Pepe, Macomb, MI (US)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 694 days.

(21) Appl. No.: 12/396,129

(22) Filed: Mar. 2, 2009

(65) Prior Publication Data

US 2010/0219629 A1 Sep. 2, 2010

(51) Int. Cl.
*F16L 33/18* (2006.01)

(52) U.S. Cl. ......... 285/379; 285/321; 285/348; 277/616

(58) Field of Classification Search .................. 285/319, 285/321, 345, 379, 348, 349; 277/616, 637, 277/640, 641
See application file for complete search history.

(56) References Cited

U.S. PATENT DOCUMENTS

| | | | |
|---|---|---|---|
| 1,902,697 A * | 3/1933 | Ellingsen | 285/276 |
| 3,711,125 A | 1/1973 | Dehar | |
| 4,126,338 A * | 11/1978 | Coel et al. | 285/330 |
| 4,655,256 A * | 4/1987 | Lasota et al. | 138/96 T |
| 4,725,081 A * | 2/1988 | Bauer | 285/305 |
| 4,801,158 A * | 1/1989 | Gomi | 285/52 |
| 5,131,691 A | 7/1992 | Washizu | |
| 5,538,297 A * | 7/1996 | Mc Naughton et al. | 285/319 |
| 5,542,717 A | 8/1996 | Rea et al. | |
| 5,586,792 A | 12/1996 | Kalahasthy et al. | |
| 5,626,371 A | 5/1997 | Bartholomew | |
| 5,725,258 A | 3/1998 | Kujawski | |
| 5,752,726 A | 5/1998 | Fixemer | |
| 5,895,078 A * | 4/1999 | Le Clinche | 285/305 |
| 5,931,510 A | 8/1999 | Mathew et al. | |
| 5,947,531 A | 9/1999 | Eckard et al. | |
| 6,086,119 A | 7/2000 | Hansel | |
| 6,733,047 B1 * | 5/2004 | Stieler | 285/319 |
| 6,832,785 B1 | 12/2004 | Zitkovic, Jr. | |
| 6,866,304 B2 | 3/2005 | Kaminski et al. | |
| 7,488,005 B2 | 2/2009 | Gunderson | |
| 7,549,679 B2 * | 6/2009 | Brosius et al. | 285/340 |
| 2003/0184089 A1 | 10/2003 | Takayanagi et al. | |
| 2005/0206161 A1 * | 9/2005 | Ogiso et al. | 285/319 |
| 2008/0028586 A1 * | 2/2008 | Blivet et al. | 29/237 |

FOREIGN PATENT DOCUMENTS

EP 1 959 182 A1 8/2008

\* cited by examiner

*Primary Examiner* — James Hewitt
(74) *Attorney, Agent, or Firm* — Leydig, Voit & Mayer, Ltd.

(57) ABSTRACT

A quick connector coupling for a fluid line includes a female connector body defining a through bore, a tubular male member with a raised annular upset, and a retainer demountably coupled to the connector body. A seal assembly provides a fluid tight seal between the tube and body bore. A separate outer spacer is secured to the body to receive axial load of the seal assembly. The body defines spaced arcuate locking ledges having axially inward facing radial locking surfaces. The outer spacer is a continuous annular element includes an integral radial ring defining an annular axially outward facing radial abutment surface in radial abutting relation to the locking surfaces of said body ledges.

18 Claims, 5 Drawing Sheets

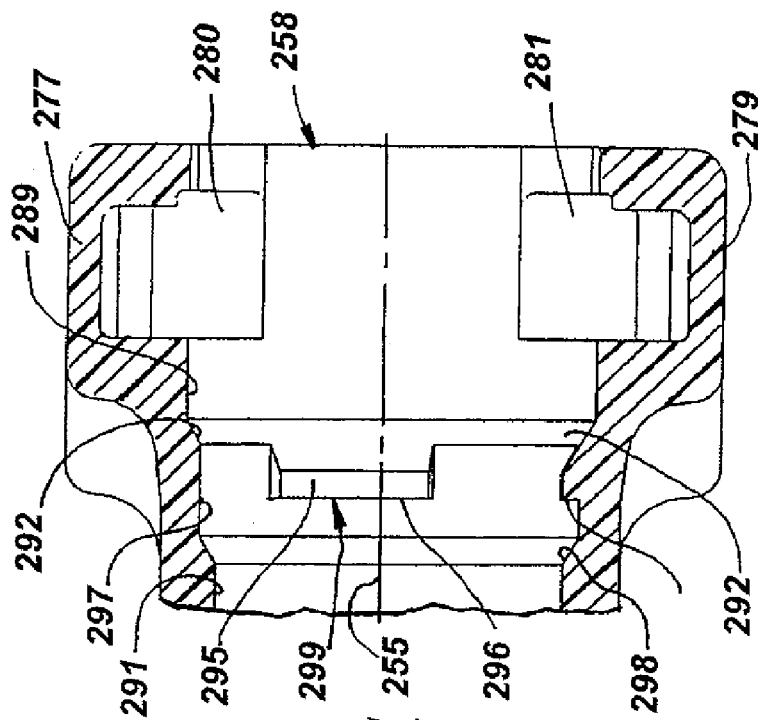
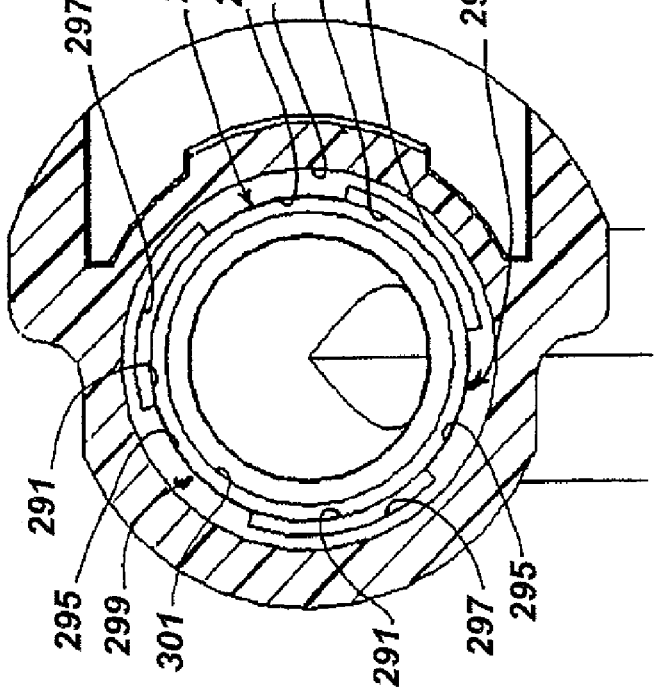

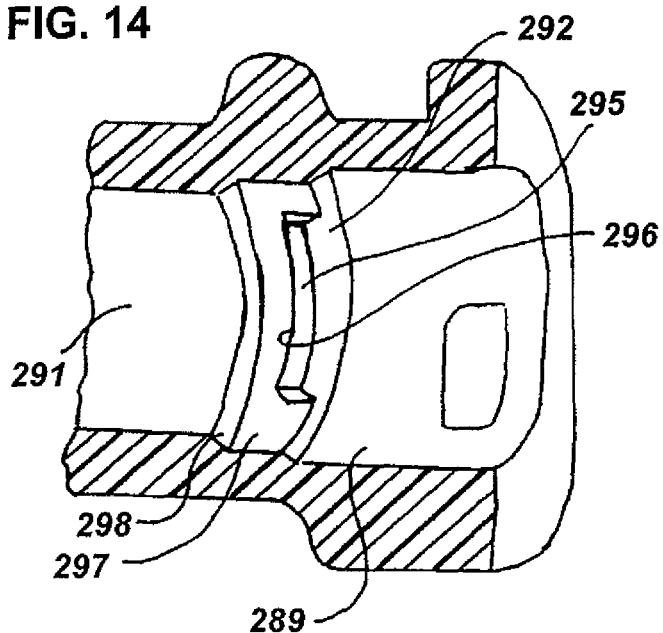
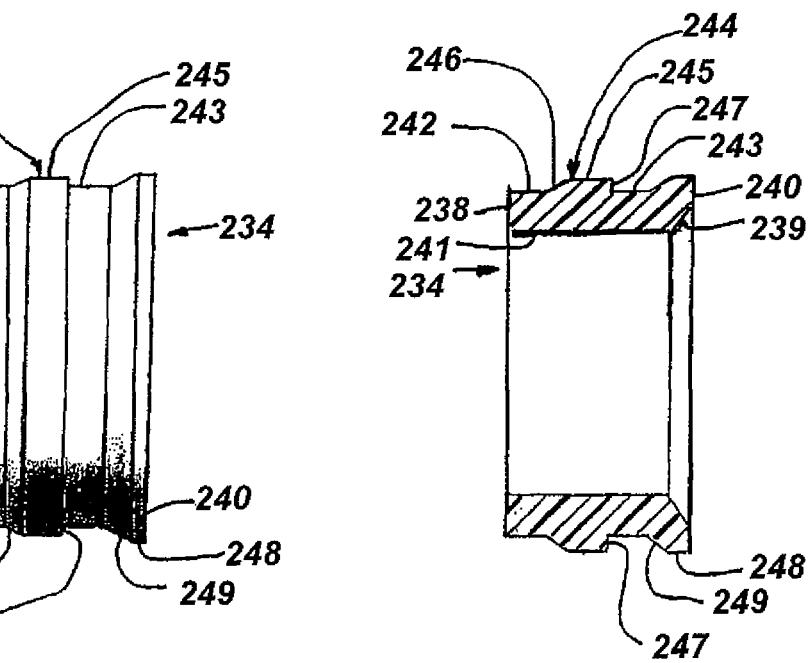

QUICK CONNECTOR WITH SEAL ASSEMBLY RETAINER

BACKGROUND OF THE INVENTION

This application relates to quick connector fluid coupling assemblies for connecting a male member formed at the end of a tube into a bore in a connector body. More particularly, it relates to such an assembly having a separate seal assembly retainer.

In the automotive and other fields, one type of coupling assembly often utilized to provide a fluid connection between two components or conduits are quick connectors, which generally include a male member received and retained in a female connector body. Use of a quick connector is advantageous in that a sealed and secured fluid line may be established with minimum amount of time and expense.

A retainer is often used to secure the male member within the connector body. The present invention is directed to this type of retainer. Beams extending through the slots are poised between the male member upset and the entrance to the connector body, thereby preventing disconnection of the coupling. Due to the physical appearance of such retainers, they are referred to in the trade as "hairpin" or "horseshoe" retainers. A good example of this type of retainer is found in U.S. Pat. No. 4,869,534.

One such arrangement is disclosed in U.S. Pat. No. 5,586,792. It includes a retainer member with transverse legs extending between a radial face formed within the connector body and an enlarged upset formed on the male member, thereby securing the male member within the connector body.

The abutment of the retainer with the upset of the male member and the annular face of the connector body prevents the withdrawal of the male member from the connector body. This type of retainer is prevalent in the art and has proven effective in many fluid line applications.

As with other types of retainers, a primary concern in the design of "horseshoe" retainers is maintaining a seal between the O-ring seal and the tube and body components. A seal assembly, usually in the form of one or more O-ring seals, is used with a quick connector coupling to create a fluid tight seal between the male member and the connector body. In such a configuration, the seal assembly is located axially inwardly of the retainer. It is usually held against axial load imparted by fluid pressure by a spacer that is press fit, or in a snap fit relation to the bore in which it is received. The injection molding process for the connector body dictates that the surfaces retaining the annular outer spacer be chamfered. This reduces the force necessary to axially displace the outer spacer. It is necessary to ensure that the axial force imparted to the components be reliably accommodated.

The quick connector coupling of the present invention addresses these concerns.

SUMMARY OF THE INVENTION

The present invention incorporates a separate seal assembly retainer or outer spacer securely engaged with the connector body to receive axial load imparted to the seal assembly assembly by fluid pressure. The resultant assembly is more resistant to axial displacement of the outer spacer. It is also more stable during side load vibrations and thermal cycling.

The present invention provides a quick connector coupling for forming a joint in a fluid line system. It includes a female connector body having a generally cylindrical exterior wall with slots formed therethrough. A through bore extends from an end of the connector body.

A male member extends through the end of the connector body and into the bore. The male member has a tubular surface and a radial annular upset having a greater diameter than the diameter of the tubular surface.

A retainer is demountably coupled to the connector body. The retainer includes two spaced beams extending through the slots and positioned between the male member upset and the connector body. The beams are movable between a locked position in which they are spaced apart a distance less than the diameter of the upset, and a release position in which the beams are spaced apart a distance greater than the upset diameter.

A seal assembly provides a fluid tight seal between the male member and the connector body. The body includes discontinuous arcuate body ledges that define axially inward facing radial locking surfaces. The seal assembly retainer or outer spacer axially restrains the seal assembly arrangement. The outer spacer includes a radially extending ring with an annular axially outward facing radial abutment surface that abuts the axially inward facing radial locking surfaces of the arcuate body ledges to secure the outer spacer against axial movement outward of the connector body. This abutting relationship between the body ledges and the radial abutment surface of the ring of the outer spacer receives axial load imparted to the seal assembly arrangement due to fluid pressure and delivers it to the connector body.

BRIEF DESCRIPTION OF THE DRAWINGS

FIG. 12 is a fragmentary sectional side view, on an enlarged scale, of the quick connector body of FIG. 11;

FIG. 13 is a sectional front view of the quick connector body taken along the line 13-13 of FIG. 11;

FIG. 14 is a fragmentary perspective sectional view illustrating interior features of the connector body of FIG. 11;

FIG. 15 is a side view of the outer spacer of the quick connector coupling assembly of FIG. 10; and FIG. 16 is a sectional side view of the outer spacer of FIG. 15.

DETAILED DESCRIPTION OF THE PREFERRED EMBODIMENT

Figure 1:
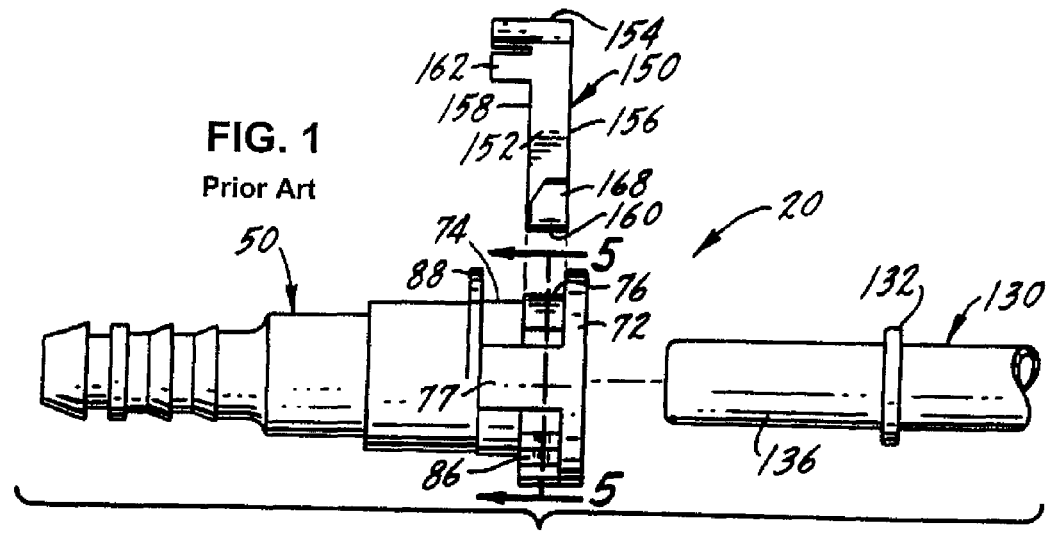
FIG. 1 is an exploded view of a known quick connector coupling.
Figure 2:
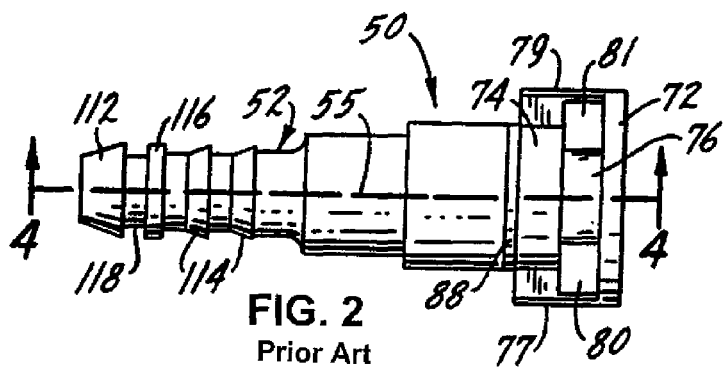
FIG. 2 is a top elevation view of a female connector body which forms a part of the quick connector coupling of FIG. 1.
Figure 3:
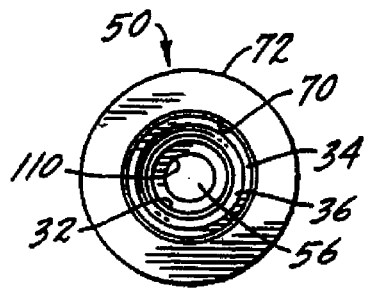
FIG. 3 is an end view of the connector body of FIG. 1.

A quick connector coupling 20 formed in a fluid line is comprised of a longitudinally elongate generally cylindrical female connector body 50 and a male member 130 secured together by a retainer 150. Male member 130 is formed at an end of a hollow tube which forms a part of a fluid line system. In use, female connector body 50 is connected to flexible tubing or hose (not shown) which is also a part of the fluid line system. Female connector body 50 and male member 130 are connectable to form a permanent, but severable, joint in the fluid line.

Connector body 50 is illustrated in detail in FIGS. 1-5. Connector body 50 is defined by a generally cylindrical, stepped exterior wall 52 and a generally cylindrical, stepped interior wall 54. Connector body 50 is centered about an axis 55, and is preferably made of a plastic material, such as nylon-12. Interior wall 54 defines a through bore 56. Bore 56 extends completely through connector body 50, from a larger diameter, male member reception end 58 to a smaller diameter, hose connection end 60.

Description of the embodiments disclosed herein necessarily involves description of the relative positioning and/or movement of various elements of the coupling. Throughout this specification and the claims which follow, the terms "inward" or "insertion" denote an axial movement, or relative position, for example away from male member reception end 58 and toward hose connection end 60 in the embodiment of FIGS. 1 to 9. Similarly, terms "outward" or "pull-back" denote an axial movement, or relative position, for example toward male member reception end 58 and away from hose connection end 60 in the embodiment of FIGS. 1 to 9. Hence, "inward movement", or "insertion", of the male member denotes male member movement toward the hose connection end of the connector body, whereas a "pull-back" on the male member is an attempt to withdraw the male member from the connector body.

Variations in the diameter of interior wall 54 of connector body 50 divide bore 56 into four distinct sections. Moving inward from male member reception end 58, they are: retainer housing portion 70, seal chamber portion 90, tube end receptacle portion 100, and fluid passageway 110.

Retainer housing portion 70 is formed adjacent male member reception end 58. It is defined by an outer annular rim 72 connected to an inner annular rim 74 by top support member 76, bottom support member 78, and side support members 77 and 79. Support members 76-79 are equidistantly spaced around connector body 50. The spaces between support members 76-79 define top retainer slots 80 and 81, and bottom retainer slots 82 and 83. Slots 80-83 are provided to receive and position retainer 150 transversely to longitudinal axis 55 of connector body 50.

A raised, semi-annular shield 88 is formed adjacent inner rim 74 opposite top support member 76. Shield 88 extends circumferentially between side support members 77 and 79.

Seal chamber portion 90 is formed inward of retainer housing portion 70. It is defined by a reduced diameter portion of wall 54, relative to retainer housing portion 70, and extends inward from a conical shoulder 92 to a radial shoulder 94. Seal chamber 90 is provided to house sealing elements to form a fluid seal between connector body 50 and male member 130.

Tube end receptacle portion 100 is formed inward of seal chamber 90. It is defined by a reduced diameter portion of wall 54, relative to seal chamber 90, which extends inward from the small diameter end of radial shoulder 94 to a radial shoulder 102. Tube end receptacle 100 is provided to receive free end of male member 130 in closely spaced piloting relation.

Fluid passageway 110 is defined by the smallest diameter portion of interior wall 54. It leads from the small diameter end of radial shoulder 102 to hose connection end 60.

The portion of exterior wall 52 surrounding fluid passageway 110 is configured to facilitate connection to another component in the fluid line. The illustrated connector body 50, for example, is specially formed for connection to a flexible hose. A conical nose 112 is formed adjacent end 60 to facilitate insertion into a flexible hose, and ramped barbs 114 are formed outward of nose 112 to retain the hose on the connector body. An annular flange 116 spaced from nose 112 defines a groove 118. Groove 118 may house an exterior O-ring seal, if desired.

Alternative exterior configurations could be employed around the fluid passageway end of connector body 50 for connection to other system arrangements. For example, it is common for the retainer housing portion 70 and the hose connection end to be at right angles to each other. Or, threads could be formed in exterior wall 52 to facilitate connection within a threaded bore of a housing containing a system component.

Retainer 150 is illustrated in detail in FIGS. 6-9. It is preferably made of a resilient, flexible material, such as plastic. Retainer 150, which extends through slots 80-83 of retainer housing portion 70, is demountably coupled to connector body 50.

Retainer 150 includes a pair of elongated, generally parallel beams 152 extending from, and joined at one end by, a cross member 154. Cross member 154 provides a separation between the beams approximately equal to the diameter of male member 130. Beams 152 have an axial width approximately equal to, but slightly less than (to allow clearance), the axial width of slots 80-83. The lateral width of beams 152 is significantly less than the lateral width of slots 80-83, in order to allow outward expansion of beams 152 (to permit male member insertion and release).

Figure 4:
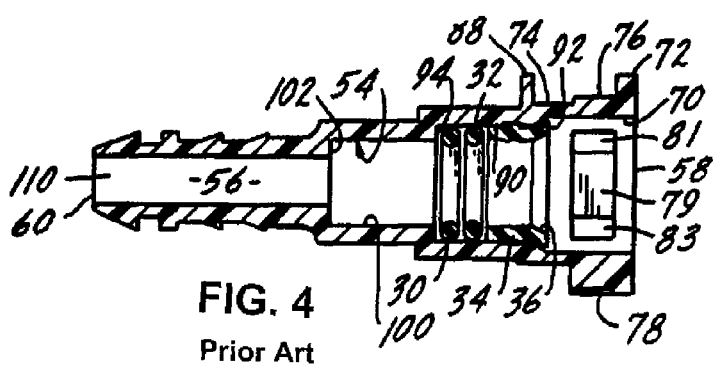
FIG. 4 is a sectional view of the connector body of FIG. 2, taken along line 4-4 of FIG. 2.
Figure 5:
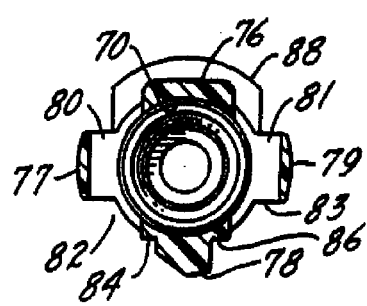
FIG. 5 is a sectional view of the connector body of FIG. 1, taken along line 5-5 of FIG. 1.
Figure 7:
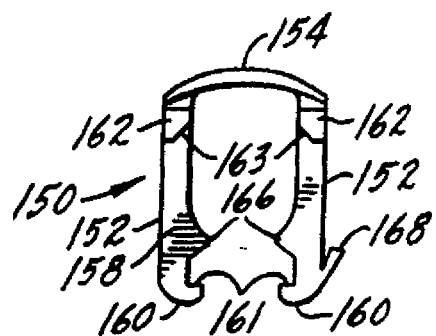
FIG. 7 is an elevation view of the retainer of FIG. 6, as viewed from the left.
Figure 6:
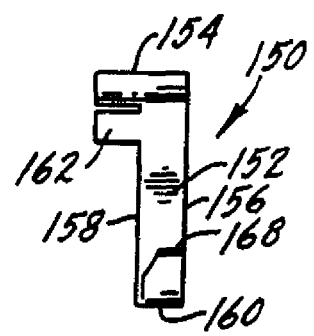
FIG. 6 is a side elevation view of a retainer which forms a part of the quick connector coupling.
Figure 8:
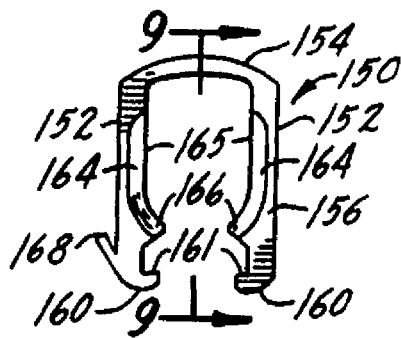
FIG. 8 is a side elevation view of the retainer of FIG. 6, as viewed from the right.
Figure 9:
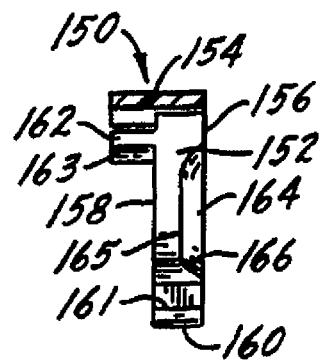
FIG. 9 is a sectional view of the retainer of FIG. 8, taken along line 9-9 of FIG. 8.

Cross member 154 has an axial width substantially greater than that of beams 152. As best seen in FIGS. 4 and 5, cross member 154 is axially aligned with the front faces 156 of beams 152, but extends axially beyond the rear faces 158 of beams 152. Cross-member 154 is formed with a slightly arcuate cross-section to provide enhanced flexibility.

Each retainer beam 152 includes a latch 160 formed at an end remote from cross member 154, a release protrusion 162 formed on rear face 158 at an end adjacent cross member 154, and a sloping lead area 164 formed on front face 156 between latch 160 and cross member 154.

When retainer 150 is fully inserted into connector body 50, latches 160 lock retainer 150 into position relative to connector body 50. Latching edges 161 defined by latches 160 engage locking shoulders 84 and 86 defined by bottom support member 78 to lock retainer 150 in place.

Release protrusions 162 protrude from the rear face of each retainer beam 152, just below cross member 154. Protrusions 162 extend axially from beams 152 a distance equal to the distance by which cross member 154 extends axially from beams 152. Ramped, or camming, surfaces 163 are formed on each protrusion 162. When assembled, release protrusions 162, and in particular, ramped surfaces 163, rest just above inner annular rim 74 of connector body 50. Pressure applied to cross member 154 to press retainer 150 further into connector body 50, causes ramped surfaces 163 contact and slide or cam against annular rim 74. Consequently, retainer beams 152 spread apart, allowing release of male member 130.

Lead areas 164 slope radially and axially inwardly from front face 156 of each retainer beam 152, and terminate approximately midway between front face 156 and rear face 158. The spacing between lead areas 164 is at its greatest adjacent front face 156. Here, the spacing is approximately equal to the diameter of upset 132 formed on male member 130. Moving from front face 156 toward rear face 158, the spacing between lead areas 164 steadily decreases. At rear edges 165 of lead areas 164, the spacing between the lead areas is approximately equal to the nominal (non-upset) diameter of male member 130. The portions of lead areas 164 closer to latches 160 curve inwardly at 166 to match the annular profile of male member upset 132. This assists in guidance and centering of male member 130 through connector body 50.

Upon initial contact with retainer beams 152, upset 132 can be pushed inwardly between beams 152 upon application of sufficient force, since the spacing between front faces 156 of beams 152 (in the lead areas) is equal to the diameter of upset 132. As inward movement of upset 132 progresses, retainer beams 152 are steadily spread apart, since the spacing between lead areas 164 steadily decreases. Once upset 132 has moved fully past beams 152, beams 152 snap into place behind upset 132, locking male member 130 into connector body 50.

The spacing between beams 152 at rear faces 158 is less than the diameter of upset 132, attempted outward movement of male member 130 does not spread beams 152 to permit release of member 130. Male member 130 can move freely past retainer beams 152 in an insertion direction only.

Male member 130, typically formed at the end of a rigid tube, is received in connector body 50. It includes a radially enlarged upset 132 formed a given distance from a free end 134. Tube end 134 is typically rounded or tapered to make insertion of male member 130 into connector body 50 less difficult. A smooth, cylindrical sealing surface 136 extends between upset 132 and tube end 134. The nominal (non-upset) outer diameter of male member 130 should be such that the end of male member 130 fits snugly within tube end receptacle 100.

A seal assembly is disposed within seal chamber 90. It comprises O-ring seals 30 and 32. The O-rings 30 and 32 are sized to fit tightly within seal chamber 90 and tightly around sealing surface 136 of male member 130. They are preferably made of a fluorocarbon or of toughened fluorosilicone. If desired, O-rings 30 and 32 could be separated by a rigid spacer ring.

O-rings 30 and 32 are secured in chamber 90 by a hollow spacer sleeve or outer spacer 34. Spacer sleeve 34 has a conically enlarged end 36 which seats against conical shoulder 92 of interior wall 54, positioning sleeve 34 within bore 56. To provide enhanced securement of spacer sleeve 34 within bore 56, a raised annular portion may be formed in the outer periphery of sleeve 34, and a corresponding annular recess formed in interior wall 54. The raised spacer portion would be matingly received in the recess formed in interior wall 54 to secure sleeve 34 into place.

In the quick connector coupling 20 FIGS. 1 to 9, spacer sleeve 34 retains the seal elements within seal chamber 90 in a relatively fixed position and prevents their escape from bore 56 when male member 130 is absent from the coupling assembly. Also, the inner diameter of sleeve 34 approximates the nominal outer diameter of the cylindrical sealing surface 136 of male member 130, minimizing radial movement of male member 130 relative to connector body 50. Finally, the enlarged end 36 of spacer sleeve 34 limits inward movement of male member 130.

Prior to insertion of male member 130 into connector body 50, the seal assembly 29 is inserted into seal chamber 90. Spacer sleeve 34 is inserted into the bore 56. The spacer extends into seal chamber 90 and retains the O-rings 30 and 32 in place. The raised annular portion on the outer periphery snaps into the annular recess formed in the interior wall 54 to secure the outer spacer or sleeve in place. Conically enlarged end 36 seats against conical shoulder 92 to position the outer spacer within the bore 56.

Retainer 150 is also attached to connector body 50. Retainer beams 152, latches 160 first, are inserted through top slots 80 and 81 of retainer housing portion 70. Retainer 150 should be oriented such that cross member 154 and release protrusions 162 are positioned above inner annular rim 74, and lead areas 164 of beams 152 face male member reception end 58.

Passage of beams 152 through the slots is facilitated by application of downward pressure on cross member 154. Assembly of retainer 150 proceeds, with latches 160 moving through bottom slots 83 and 84. An increase in downward pressure is necessary when latches 160 contact the sides of bottom support 78. With application of sufficient pressure, the rounded ends of latches 160 slide against the sides of support 78, spreading beams 152 apart and allowing latches 160 to pass by support 78. When latches 160 clear bottom support 78, latching edges 161 snap under locking shoulders 84 and 86 of bottom support 78, securing retainer 150 to connector body 50.

Coupling 20 is completed by inserting male member 130 into connector body 50. End 134 of male member 130 passes between retainer beams 152 and into seal chamber 90 with little or no resistance, as the spacing of beams 152 is approximately equal to the nominal diameter of male member 130.

Resistance to insertion occurs when upset 132 contacts retainer beams 152. Lead areas 164 of retainer beams 152 permit passage of upset 132 between beams 152 upon application of sufficient force. As upset 132 passes between beams 152, it rides along the lead areas 164, steadily flexing beams 152 outwardly. Once upset 132 has passed, beams 152 spring back into place behind upset 132. Rear faces 158 of beams 152 abut upset 132 to prevent subsequent withdrawal of male member 130 from connector body 50. Male member 130 is in a locked position.

Outer spacer 34, along with the diameter reduction occurring in bore 56, prevent further appreciable inward insertion of male member 130 from the locked position. However, the spacing between retainer beams 152 and spacer end 36 is sufficient to permit slight axial movement of male member 130 relative to connector body 50. In the locked position, O-rings 30 and 32 form a fluid seal between sealing surface 136 of male member 130 and interior wall 54 of seal chamber 90.

Downward pressure on cross member 154 causes contact between release protrusions 162 (which extend away from beams 152 underneath cross member 154) and inner annular rim 74 of connector body 50. Ramped surfaces 163 of protrusions 162 slide or cam against rim 74, causing beams 152 to spread steadily apart as application of pressure continues. Eventually, beams 152 will be spread apart a distance sufficient to allow passage of upset 132 between beams 152. Male member 130 may then be withdrawn from connector body 50. Upon withdrawal of member 130 from body 150 and relaxation of retainer 150, retainer 150 reassumes its normal installed position.

FIGS. 10 to 16 illustrate an advance in quick connector design that improves sealing capability of the seal assembly relative to the body bore and male member. It also provides an abutting connection between the seal assembly retainer (outer spacer) and connector body to receive and resist axial loading of the seal assembly imposed by fluid pressure on the O-ring seals. Because the seal assembly retainer is securely connected to the body it also transfers O-ring axial load to the connector body rather than delivering it to the tube retainer through the tube upset.

The quick connector coupling of FIGS. 10 to 16 is configured generally as disclosed in FIGS. 1-9. It includes a hollow body 250 a tube retainer 350, a male member 330, a seal assembly 229 and an outer spacer or seal assembly retainer 234. It includes an enhanced positive connection of the retention mechanism for the seal assembly within the bore of the connector body. The interior of the body bore is modified, as is the exterior of the outer spacer or seal assembly retainer.

Figure 10:
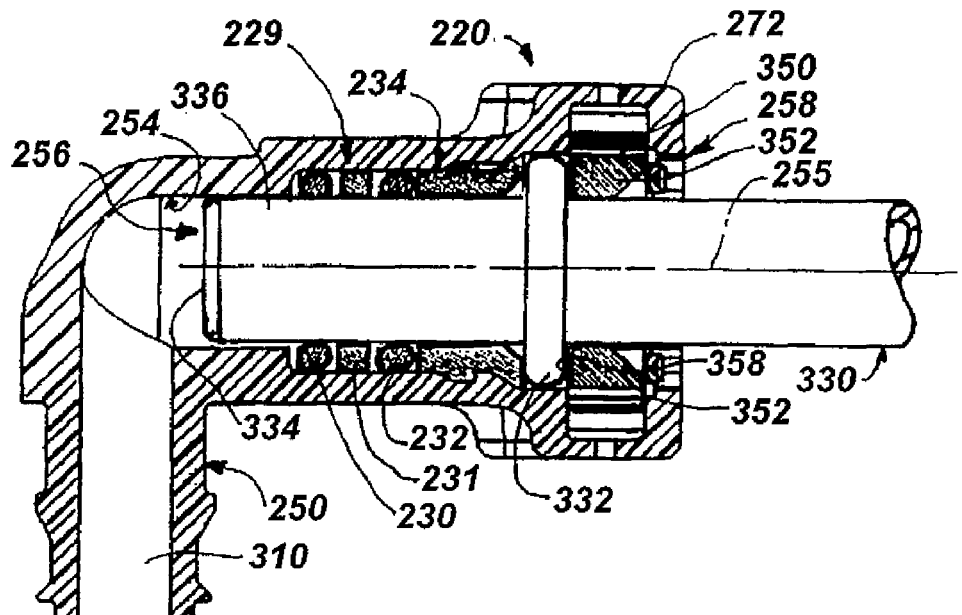
FIG. 10 is a side view, partially in section, of a quick connector coupling assembly illustrative of the present invention.

Referring to FIG. 10, a quick connector coupling 220 is comprised of a longitudinally elongate generally cylindrical female connector body 250 having a stem portion formed at a 90° angle to the body portion. A male member 330 is secured by a retainer 350. Male member 330 is formed at an end of a hollow tube which forms a part of a fluid line system. In use, the stem end of female connector body 250 is connected to a flexible hose (not shown) which is also a part of the fluid line system.

Connector body 250 is illustrated in detail in FIGS. 10 to 16. Connector body 250 is defined by a generally cylindrical, stepped exterior wall surface 252 and a generally cylindrical, stepped interior wall surface 254. Connector body 250 is centered about an axis 255, and is preferably made of a plastic material, such as polypthalamide (PPA).

Interior wall 254 defines a through bore 256. Bore 256 extends completely through connector body 250, from a larger diameter, male member reception end 258 to a smaller diameter, hose connection end 260. The body includes a 90° bend between the male member reception end 258 and the hose connection end 260, though that configuration could be linear as in the connector body of FIGS. 1-9.

Variations in the diameter of interior wall 254 of connector body 250 divide bore 256 into four distinct portions. Moving inward from male member reception end 258, they are: retainer housing portion 270, seal chamber portion 290, tube end receptacle portion 300, and fluid passageway portion 310. The fluid passageway portion 310 is disposed at 90° to the remainder of the through bore 256.

Figure 11:
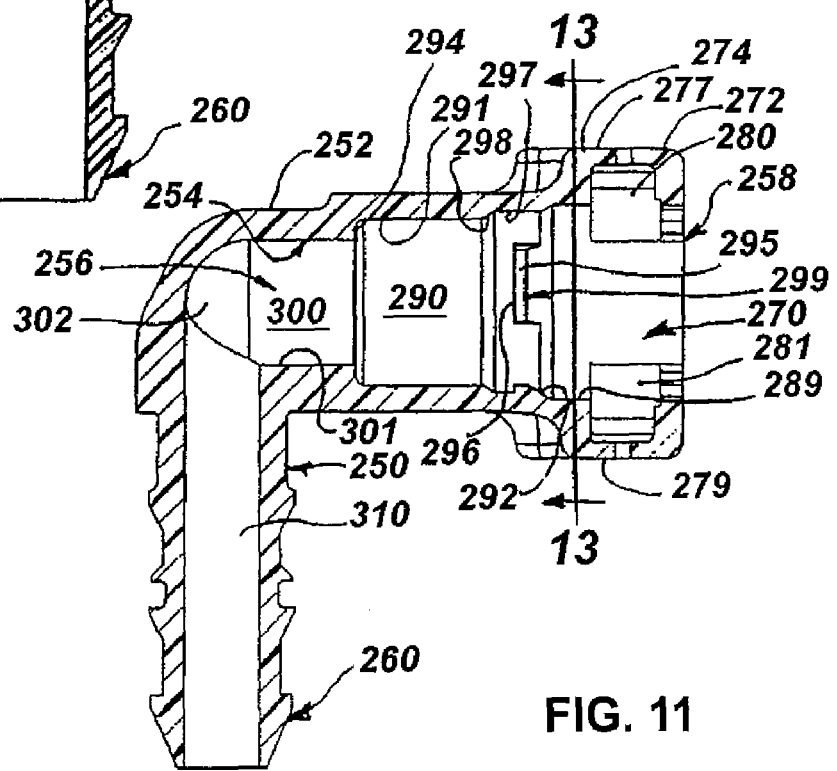
FIG. 11 is a sectional side view of the body of the quick connector coupling of FIG. 10.

Retainer housing portion 270 is formed adjacent male member reception end 258. It includes axial wall surface 289 defined by inner wall 254. It is formed identically to the retainer housing portion 70 of FIGS. 1-9. Visible in FIGS. 10 and 11 are outer annular rim 272 connected to an inner annular rim 274 by support members including side support members 277 and 279. As in the earlier embodiment, slots are defined between the support members which receive the legs of the tube retainer. Slots 280-281 seen in FIGS. 10 and 11 receive and position retainer beams transversely to longitudinal axis 255 of connector body 250 as in the previous embodiment.

Seal chamber portion 290 is formed inward of retainer housing portion 270. It is defined by axial wall surface 291 of wall 254 of reduced diameter, relative to wall surface 289 of retainer housing portion 270. It extends axially inwardly to radial shoulder 294. Seal chamber portion 290 houses sealing elements to form a fluid tight seal between connector body 250 and male member 330 as in the earlier embodiment.

As best seen in FIGS. 11, 12 and 14, inwardly converging conical shoulder surface 292 extends to an intermediate axial cylindrical surface 297. The intermediate axial cylindrical surface 297 is interrupted by a plurality of spaced arcuate body locking ledges 299. At each locking ledge 299, the conical shoulder surface 292 extends radially inwardly and terminates at a radially inner arcuate axial segment 295 that is formed on the same diameter as the cylindrical wall surface 291 defining seal chamber portion 290. The radially inner arcuate axial segment 297 of each locking ledge extends between conical shoulder surface 292 and an inward facing radial locking surface 296. Intermediate axial cylindrical surface 297 has a diameter smaller than the diameter of axial wall surface 289 of retainer housing portion and larger than axial wall surface 291 of seal chamber portion 290. It intersects conical shoulder surface 292 and extends axially to a conical surface 298 that converges axially inwardly to axial wall surface 291 defining seal chamber portion 290.

The axial inward facing radial locking surface 296 of each locking ledge 299 defines an arcuate radial face having a radially inner diameter defined by radially inner arcuate axial segments 295 equal to the diameter of reduced diameter axial cylindrical wall surface 291 defining seal chamber portion 290 and an outer diameter equal to the diameter of intermediate axial cylindrical surface 297. The surfaces 296 are radial abutments to receive axial loads from the outer spacer 234.

As best seen in FIG. 13, there are three locking ledges depicted in the illustrated embodiment. Each has an arcuate length of twenty degrees (20°) and are circumferentially equally spaced, with radial centerlines 120° apart. Of course, different arrays of locking ledges can be used as is contemplated within the inventive concept. For example, two or four equally spaced locking ledges could be employed. Also, it is contemplated that, if desired, the circumferential spacing may, in some instances, be unequal.

Tube end receptacle portion 300 is formed inward of seal chamber 290. It is defined by a wall surface 301 of wall 254, having a reduced diameter relative to seal chamber 290. It extends inward from the small diameter end of radial shoulder 294 to junction 302. Tube end receptacle portion 300 is provided to receive the free end of male member 330 in closely spaced piloting relation. That is, the diameter of wall surface 301 is slightly larger than the outer diameter of the cylindrical surface of the tube defining male member 330 This relationship minimizes transverse movement of the tube end within the bore 256 of body 250.

Fluid passageway 310 is defined by the smallest diameter wall surface of interior wall 254. It leads from the junction 302 to hose connection end 260.

The exterior wall 252 surrounding fluid passageway 310 is configured to facilitate connection to another component in the fluid line as in the embodiment of FIGS. 1 to 9. The illustrated connector body 250, for example, is specially formed for connection to a flexible hose. Alternative exterior configurations could be employed at the fluid passageway end of connector body 250 for connection to other system arrangements.

Retainer 350 is identical in detail to the retainer 150 of the embodiment of FIGS. 1-9. It is preferably made of a resilient, flexible material, such as polyphtalamide. Retainer 350, which extends through the slots of retainer housing portion 270, is demountably coupled to connector body 250 as in the earlier embodiment.

Retainer 350 includes a pair of elongated, generally parallel beams 352 extending from, and joined at one end by, a cross member as in the embodiment of FIGS. 1 to 9. It is configured as described with reference to the earlier embodiment and as illustrated in FIGS. 6-9.

Male member 330, is formed at the end of a rigid tube, and is received in connector body 250. It includes a radially enlarged upset 332 formed a given distance from a free end 334. Tube end 334 is typically rounded or tapered to make insertion of male member 330 into connector body 250 less difficult. A smooth, cylindrical sealing surface 336 extends between upset 332 and tube end 334. As already explained, the nominal (non-upset) outer diameter of cylindrical sealing surface 336 of male member 330 is sized such that the end of male member 330 fits snugly within tube end receptacle portion 300 to minimize movement transverse to the centerline 255 of connector body 250.

Disposed within seal chamber 290 is seal assembly 229 having O-ring seals 230 and 232. O-rings 230 and 232 are sized to fit tightly within seal chamber 290 and tightly around sealing surface 336 of male member 330. As illustrated, the seal assembly O-rings 230 and 232 are separated by a rigid spacer ring 231. O-rings 230 and 232 are made of a fluorocarbon or of toughened fluorosilicone. The particular arrangement of the seal assembly is not critical to the present invention.

In the embodiment of FIGS. 10 to 16, O-rings 230 and 232 and spacer 231 are secured in chamber 290 by seal assembly retainer or outer spacer 234. In accordance with the present invention, the seal assembly retainer 234 is configured to engage body 250 in a positive radially abutting relationship. The outer spacer provides enhanced resistance to outward axial displacement. Since it receives axial outward loading from the seal assembly 229, when the system is pressurized, it effectively transfers such loads directly to the body 250 at locking ledges 299.

Best seen in FIGS. 15 and 16, seal assembly retainer or outer spacer 234 is a continuous generally annular element having a radial annular inward surface 238 and a radial annular outward surface 240. It is molded of a plastic material such as polypthalamide. Through bore 241 is sized to receive the outer cylindrical surface of 336 of male member 330 in closely spaced sliding relation. That is, the diameter of bore 241 is about the same size as the diameter of surface 301 defining tube end receptacle portion 301. Outer spacer 234 includes a chamfer 239 to aid in the insertion of the end 334 of male member 330 during assembly.

An inward axial cylindrical surface 242 of outer spacer 234 adjacent radial annular inward surface 238 is formed on a diameter that is slidably received in reduced diameter axial surface 291 defining seal assembly receiving portion 290. An intermediate cylindrical surface 243 is formed on the same diameter. It is separated from inward cylindrical surface 242 by integral radial ring 244.

Integral radial ring 244 has an outer axial cylindrical surface 245 sized slightly smaller than intermediate axial cylindrical surface 297 of body 250. It is therefore slidably received in intermediate axial cylindrical surface 297. It is joined to inward axial cylindrical surface 242 by inward converging conical surface 246.

An annular axially outward facing radial abutment surface 247 extends between outer axial cylindrical surface 245 of integral radial ring 244 and intermediate cylindrical surface 243. The outward end adjacent annular outward radial surface 240 defines an outward end axial cylindrical surface 248 having the same diameter as outer axial cylindrical surface 245 of integral radial ring 244. It is joined to intermediate cylindrical surface 243 by inwardly converging conical surface 249.

Assembly of the quick connector coupling 220 is similar to the coupling 20 of the embodiment of FIGS. 1 to 9 with the exception that outer spacer or seal assembly retainer 234 is positively locked in place by radial abutment of annular axially outward facing radial abutment surface 247 of outer spacer 236 with axially inward facing radial locking surfaces 296 of body locking ledges 299.

Seal assembly 229 comprising O-rings 230 and 232 and spacer ring 231 are inserted into seal chamber portion 290. The outer spacer 234 is inserted into bore 256. The inward axial cylindrical surface 242 enters reduced diameter axial surface 291 of seal chamber portion 290. To achieve full insertion integral radial ring 244 must pass inward beyond body locking edges 299. Because the diameter at radially inner arcuate axial segments 295 of locking ledges 299 is smaller than the outer axial cylindrical surface 245 of integral radial ring 244, the continuous annular outer spacer 234 must deflect radially inwardly and the body 250 at the locking ledges 299 must deflect radially outwardly to permit the inward insertion process.

On full insertion of the outer spacer 234, the annular outward facing radial abutment surface 247 is in radial abutting relation with the inward facing radial locking surfaces 296 of the body locking ledges 299. This relationship secures outer spacer 234 against axial outward movement. Because the outer spacer is continuous, it resists radial inward deformations from forces due to fluid pressure in the fluid system.

The inward axial cylindrical surface 242 of outer spacer 239 is disposed in seal chamber portion 290 surrounded by reduced diameter axial surface 291. The radial annular inward surface 238 is adjacent O-ring seal 232 and defines a seal space with radial shoulder 294 of body bore 256. The integral radial ring 244 resides inward of locking ledges 299. Conical axial surface 298 of body bore 256 overlies inward converging conical surface 246. Intermediate axial cylindrical surface 297 of body bore 256 overlies outer axial cylindrical surface 245 of integral radial ring 244. Inward converging conical surface 249 of outer spacer 234 is in abutting relation with conical shoulder surface 292. This relationship fixes the axial inward limit of permissible insertion of the outer spacer 234 relative to the body bore 256. The radial annular outward surface 240 of outer spacer 234 faces the upset 332 of male member 330 when it is in position within bore 256. This relationship defines the axial inward limit of the position of male member 330.

Outer spacer 234 retains the seal elements within seal chamber portion 290 in a relatively fixed position in bore 256. Also, the outer cylindrical sealing surface 336 of male member 330 is slidably received in bore 241 of outer spacer 234, minimizing transverse movement of male member 330 relative to outer spacer 234 and connector body 250.

Tube retainer 350 is attached to connector body 250. Retainer beams 352 are inserted through top slots 280 and 281 of retainer housing portion 270. Coupling 220 is completed by inserting male member 330 into connector body 250. End 334 of male member 330 passes between retainer beams 352 and into seal chamber portion 290. The spacing of beams 352 is approximately equal to the nominal diameter of cylindrical sealing surface 336 male member 330.

Resistance to insertion occurs when upset 332 contacts retainer beams 352 which causes the beams to spread apart. As upset 332 passes between beams 352, it steadily flexes the beams 352 outwardly. Once upset 332 has passed, beams 352 spring back into place behind upset 332. Inward faces 358 of beams 352 abut upset 332 to prevent subsequent withdrawal of male member 330 from connector body 250. Male member 330 is in a locked position.

Separation of the male member 330 from connector body 250 is accomplished in the same manner as previously described in regard to the embodiment of FIGS. 1 to 9.

With the annular axially outward facing radial abutment surface 247 of outer spacer 234 disposed in abutting relation to the inward facing radial locking surfaces 296 of the body locking ledges 299, the outer spacer is essentially permanently installed. It therefore secures the seal assembly 229 in place. The male member 330 may be withdrawn without dislodging the seals 230 and 232 and spacer ring 231 of seal assembly 229.

Various features of the present invention have been explained with reference to the embodiment shown and described. It must be understood, however, that modification may be made without departing from the spirit of the invention and scope of the following claims.

The invention claimed is:

1. A quick connector coupling including:
a connector body having a generally cylindrical, stepped interior wall surface defining a throughbore, said throughbore of said body defining a retainer housing portion having an axial wall surface and a seal chamber portion having a cylindrical wall surface of reduced diameter relative to said wall surface of said retainer housing portion;
wherein said throughbore includes an axial cylindrical surface intermediate said axial wall surface of said retainer housing portion and said cylindrical wall surface of said seal chamber portion having a diameter smaller than the diameter of said axial wall surface of said retainer housing portion and larger than said diameter of said cylindrical wall surface of said seal chamber portion,
a seal assembly disposed in said seal chamber portion for providing a fluid tight seal between said connector body and a cylindrical sealing surface of a male member and
a generally annular separate seal assembly retainer secured to said connector body in said throughbore,
said connector body defining a plurality of circumferentially spaced arcuate locking ledges extending radially inwardly from said intermediate axial cylindrical surface in said throughbore, each said locking ledge including an axially inward facing radial locking surface, and a radially inner arcuate axial segment,
said seal assembly retainer including an annular axially outward facing radial abutment surface in abutting relation to said axially inward facing radial locking surfaces of said locking ledges,
and wherein said connector body includes a conical shoulder surface extending between said axial wall surface of said retainer housing portion and said intermediate axial cylindrical surface, said conical shoulder surface further extending between said axial wall surface of said retainer housing portion and said radial inner arcuate axial segment of each said locking ledge.

2. A quick connector coupling as claimed in claim 1 wherein said radial inner arcuate axial segments are formed on the same diameter as the diameter of said cylindrical wall surface of said seal chamber portion of said throughbore.

3. A quick connector coupling as claimed in claim 2 said seal assembly retainer including an inward axial cylindrical surface slidably disposed in said cylindrical wall surface of said seal chamber portion and an integral radial ring defining an outer axial cylindrical surface slidably disposed in said intermediate axial cylindrical surface of said body, said integral radial ring defining said annular axially outward facing radial abutment surface in abutting relation to said axially inward facing radial locking surfaces of said locking ledges.

4. A quick connector coupling as claimed in claim 3 wherein said radial inner arcuate axial segment of each said locking ledge has a diameter smaller than the outer axial cylindrical surface of said integral radial ring.

5. A quick connector coupling as claimed in claim 4 wherein said connector body is deformable radially outwardly at said locking ledges.

6. A quick connector coupling as claimed in claim 5 wherein said seal assembly retainer is deformable radially inwardly at said integral radial ring.

7. A quick connector coupling as claimed in claim 5 wherein said locking ledges are equally spaced about said throughbore of said connector body.

8. A quick connector coupling as claimed in claim 7 wherein said quick connector body includes three locking ledges in said throughbore.

9. A quick connector coupling as claimed in claim 8 wherein said locking ledges each have an arcuate length of about twenty degrees (20°) and are equally spaced with radial centerlines one hundred twenty degrees (120°) apart.

10. A quick connector coupling as claimed in claim 4 wherein said coupling includes a tubular male member releasably retained in said throughbore and having a free end, a raised annular upset spaced therefrom, and a cylindrical sealing surface therebetween;
a tube retainer releasably connected to said connector body releasably retaining said tubular member in said throughbore.

11. A quick connector coupling as claimed in claim 3 wherein said seal assembly retainer includes an inwardly converging conical surface spaced outward of said outward facing radial abutment surface and said inwardly converging conical surface is disposed in overlying abutting relation to said conical shoulder surface extending between said axial wall portion of said retainer portion and said intermediate axial cylindrical surface.

12. A quick connector coupling as claimed in claim 11 wherein said seal assembly retainer includes a radial annular outward surface and said coupling includes a rigid tube received in said connector body having a radially enlarged upset, said radial annular outward surface of said seal assembly retainer in radial abutting relation to said radially enlarged upset of said tube.

13. A quick connector coupling as claimed in claim 1 wherein said locking ledges are equally spaced about said throughbore of said connector body.

14. A quick connector coupling as claimed in claim 13 wherein said quick connector body includes three locking ledges in said throughbore.

15. A quick connector coupling as claimed in claim 14 wherein said locking ledges each have an arcuate length of about twenty degrees (20°) and are equally spaced with radial centerlines one hundred twenty degrees (120°) apart.

16. A quick connector coupling as claimed in claim 1, wherein said locking ledges are equally spaced about said throughbore of said connector body.

17. A quick connector coupling as claimed in claim 16 wherein said quick connector body includes three locking ledges in said throughbore.

18. A quick connector coupling as claimed in claim 17 wherein said locking ledges each have an arcuate length of about twenty degrees (20°) and are equally spaced with radial centerlines one hundred twenty degrees (120°) apart.

* * * * *